United States Patent
Kwon et al.

(10) Patent No.: US 11,066,573 B2
(45) Date of Patent: Jul. 20, 2021

(54) RESIN COMPOSITION, BLACK RESIN COATED STEEL SHEET USING SAME, AND METHOD OF PREPARING SAME

(71) Applicant: POSCO, Pohang-si (KR)

(72) Inventors: Moon Jae Kwon, Pohang-si (KR); Kee Cheol Park, Pohang-si (KR); Choon Ho Kang, Pohang-si (KR)

(73) Assignee: POSCO, Pohang-si (KR)

( * ) Notice: Subject to any disclaimer, the term of this patent is extended or adjusted under 35 U.S.C. 154(b) by 264 days.

(21) Appl. No.: 16/061,142

(22) PCT Filed: Dec. 9, 2016

(86) PCT No.: PCT/KR2016/014472
§ 371 (c)(1),
(2) Date: Oct. 17, 2018

(87) PCT Pub. No.: WO2017/099533
PCT Pub. Date: Jun. 15, 2017

(65) Prior Publication Data
US 2019/0040277 A1 Feb. 7, 2019

(30) Foreign Application Priority Data
Dec. 9, 2015 (KR) .................. 10-2015-0175376

(51) Int. Cl.
*C09D 167/00* (2006.01)
*C09D 7/45* (2018.01)
(Continued)

(52) U.S. Cl.
CPC ............ *C09D 167/00* (2013.01); *C08L 67/02* (2013.01); *C09D 7/45* (2018.01); *C09D 7/47* (2018.01);
(Continued)

(58) Field of Classification Search
None
See application file for complete search history.

(56) References Cited

U.S. PATENT DOCUMENTS 3,639,350 A * 2/1972 Lazarus et al. ......... C07C 69/82
528/285
5,766,888 A    6/1998 Sobol et al.
(Continued)

FOREIGN PATENT DOCUMENTS

CN          1135379 A       11/1996
CN        101394998 A        3/2009
(Continued)

OTHER PUBLICATIONS

Japanese Office Action dated Jul. 9, 2019 issued in Japanese Patent Application No. 2018-529263.
(Continued)

*Primary Examiner* — Tae H Yoon
(74) *Attorney, Agent, or Firm* — Morgan, Lewis & Bockius LLP (57) ABSTRACT

The present invention relates to a resin composition comprising 40% to 50% by weight of a polyester resin on the basis of a total of 100% by weight of the composition, the polyester resin comprising a main resin and an auxiliary resin, wherein the main resin has a higher molecular weight than the auxiliary resin, and the difference of a glass transition temperature between the main resin and the auxiliary resin is 25° C. or less.

5 Claims, 3 Drawing Sheets (51) Int. Cl.
*C09D 7/47* (2018.01)
*C09D 7/61* (2018.01)
*C09D 7/65* (2018.01)
*C08L 67/02* (2006.01)
*C23C 2/06* (2006.01)
*C23C 2/40* (2006.01)
*C23C 2/28* (2006.01)
*C23C 28/00* (2006.01)
*C08K 3/22* (2006.01)
*C08K 3/04* (2006.01)

(52) U.S. Cl.
CPC ............ *C09D 7/61* (2018.01); *C09D 7/65* (2018.01); *C23C 2/06* (2013.01); *C23C 2/28* (2013.01); *C23C 2/40* (2013.01); *C23C 28/00* (2013.01); *C08K 3/04* (2013.01); *C08K 2003/2241* (2013.01)

(56) References Cited

U.S. PATENT DOCUMENTS

| | | | | |
|---|---|---|---|---|
| 6,200,683 | B1* | 3/2001 | Montague | C09D 167/00 428/430 |
| 7,001,943 | B2* | 2/2006 | Yuan | C08G 18/4202 524/413 |
| 8,329,313 | B2* | 12/2012 | Lee | C09D 167/00 428/626 |
| 8,663,793 | B2* | 3/2014 | Jo | C08K 7/24 428/323 |
| 8,715,837 | B2* | 5/2014 | Tada | H05K 9/0096 428/626 |
| 2009/0011274 | A1 | 1/2009 | Ogata et al. | |
| 2010/0098939 | A1* | 4/2010 | Tada | C09D 7/62 428/336 |
| 2011/0244245 | A1* | 10/2011 | Elgimiabi | B32B 5/02 428/416 |
| 2011/0311727 | A1* | 12/2011 | Kang | C09D 5/084 427/327 |
| 2014/0018484 | A1 | 1/2014 | Kim | |

FOREIGN PATENT DOCUMENTS

| | | | |
|---|---|---|---|
| JP | H06-125519 | A | 5/1994 |
| JP | 408052420 | * | 2/1996 |
| JP | 2010-247396 | A | 11/2010 |
| JP | 2014-515053 | A | 6/2014 |
| JP | 2015-085561 | A | 5/2015 |
| KR | 10-2006-0084170 | A | 7/2006 |
| KR | 10-2012-0089936 | A | 8/2012 |
| KR | 10-2014-0014817 | A | 2/2014 |
| KR | 10-2014-0040996 | A | 4/2014 |
| KR | 10-1383008 | B1 | 4/2014 |
| KR | 10-1417372 | B1 | 7/2014 |
| KR | 10-2014-0113835 | A | 9/2014 |
| KR | 10-2016-0071219 | A | 6/2016 |
| WO | 2014112544 | A1 | 7/2014 |

OTHER PUBLICATIONS

Chinese Office Action dated Nov. 19, 2019 issued in Chinese Patent Application No. 201680072319.2.
Written Opinion and International Search Report dated Mar. 16, 2017 issued in International Patent Application No. PCT/KR2016/014472 (with English translation).
Du-Hwan Jo, et al., "Development of High Functional Black Resin Coated Electrogalvanized Steel Sheet for Digital TV Panel," Corrosion Science and Technology, vol. 12, No. 1 (2013), pp. 1-6.

* cited by examiner

RESIN COMPOSITION, BLACK RESIN COATED STEEL SHEET USING SAME, AND METHOD OF PREPARING SAME

CROSS REFERENCE

This patent application is the U.S. National Phase under 35 U.S.C. § 371 of International Application No. PCT/KR2016/014472, filed on Dec. 9, 2016, which claims the benefit of Korean Patent Application No. 10-2015-0175376, filed on Dec. 9, 2015, the entire contents of each are hereby incorporated by reference.

TECHNICAL FIELD

The present invention relates to a resin composition for steel sheet surface treatment, a black resin coated steel sheet using the same, and a method of preparing the same.

BACKGROUND ART

A black resin coated steel sheet is a steel sheet which is applied to a rear cover of various TV displays such as liquid crystal display (LCD), and light emitting diode (LED), and the like. The steel sheet is post-treated with a black resin in a form of pre-coated metal (PCM) in a painting industry, transported to a processing company, sheared to a size appropriate for a press inch, and finally transported to a pressing company. In the past, general punching oil was applied to a pressing process, and continuously subjected to degreasing, washing and drying processes, such that it was easy to secure press moldability. However, in recent years, in order to omit subsequent processes such as degreasing, washing, and the like, after the pressing, application of a quick-drying punching oil with a high volatilization rate and low viscosity as compared to conventional punching oil is expanding. As a quick-drying punching oil is generally water-insoluble using high volatile solvents such as toluene, xylene, and the like, in addition to aliphatic hydrocarbon as a solvent, and serves to cool heat occurring by friction between a steel sheet and press mold during pressing, and supplement lubricity of the steel sheet.

From the viewpoint of supplementing the lubricity of the steel sheet, the quick-drying punching oil has a relatively small lubricity supplementing action as compared to the conventional punching oil, stain remains after volatizing the punching oil, particularly resulting in a problem that stain occurrence is severe in the winter season. Therefore, a higher level of lubricity of the steel sheet itself is required, and technological progress is required to minimize reactivity between the steel sheet and the punching oil, particularly, in an environment where the volatilization of the punching oil is delayed as in the winter season.

Conventionally, hot air curing has generally been applied for solution heating after black resin coating. Hot air curing is a method of blowing warm air into a curing furnace to transfer heat to a strip. Most of manufacturers of color coated steel sheet in domestic and overseas markets have applied the hot air curing method.

On the other hand, in the present invention, induction heating is applied, which is a method of curing by a moving conductor, that is, an induction current generated when a strip passes through a magnetic field. In the hot air curing, heat transfer is achieved by convection, whereas in the induction heating, heat is first generated in a steel sheet which is a subject to be heated and heat transfer is performed by a conduction method having a higher heat transfer efficiency than the convection, and thus heating efficiency is relatively excellent.

However, when heat is transferred from a base steel to a black resin coating layer, an adhesion amount of a chromium-free undercoat which is an intermediate layer is very large, thermal conductivity may be rapidly reduced, causing a problem such as defective curing of the topcoat of the black resin. Therefore, technological progress is required to maximize the heating efficiency in the induction heating and to secure a good surface quality.

DISCLOSURE

Technical Problem

The present invention has been made in an effort to provide a resin composition for steel sheet surface treatment, a black resin coated steel sheet using the same, and a method of preparing the same.

Technical Solution

An exemplary embodiment of the present invention provides a resin composition comprising 40% to 50% by weight of a polyester resin on the basis of a total of 100% by weight of the composition, the polyester resin including a main resin and an auxiliary resin, wherein the main resin has a higher molecular weight than the auxiliary resin, and a difference of a glass transition temperature between the main resin and the auxiliary resin is 25° C. or less. The main resin is included in an amount of 15 to 50% by weight on the basis of 100% by weight of the polyester resin, the molecular weight of the main resin may be more than 15,000 Mn to 80,000 Mn or less, and the molecular weight of the auxiliary resin may be 12,000 Mn to 20,000 Mn.

The glass transition temperature of the main resin may be 5 to 20° C. and the glass transition temperature of the auxiliary resin may be 20 to 30° C.

The resin composition may further include, on the basis of a total of 100% by weight of the composition, 3 to 10% by weight of the melamine resin, 1 to 5% by weight of the abrasion-resistant particle, 0.1 to 3% by weight of the wax, and the residual solvent.

The abrasion-resistant particle may include polymethyl methacrylate, acryl, or a combination thereof.

The wax may include polyethylene, polyethylene-polytetrafluoroethylene, or a combination thereof.

The solvent may include propylene glycol methyl ether acetate, a ketone-based, a hydrocarbon-based, a dibasic ester, or a combination thereof.

The resin composition may further include, on the basis of a total of 100% by weight of the composition, 0.3 to 1.5% by weight of an acid catalyst, 3 to 5% by weight of a pigment, and 2 to 5% by weight of an additive.

The acid catalyst may be dinonylnaphthalene sulfonic acid.

The pigment may be a mixture of carbon black and titanium oxide, and a weight ratio of the carbon black to the titanium oxide may be 1 to 30.

The additive may include an adhesion promoter, a leveling agent, a dispersing agent, and a quencher.

The adhesion promoter may include a hydroxyl phosphate ester, or a combination thereof.

The leveling agent may include polyacrylate, polysiloxane, or a combination thereof.

Another embodiment of the present invention provides a black resin coated steel sheet including a base steel sheet; a chromium-free undercoat film positioned on one side or both sides of the base steel sheet; and a coating layer positioned on the chromium-free undercoat film, wherein, on the basis of a total element composition of 100% by weight of the coating layer, the coating layer includes 70 to 80% by weight of carbon (C), 1 to 4% by weight of silicon (Si), 1 to 5% by weight of titanium (Ti), and residual oxygen (O).

The coating layer includes abrasion-resistant particles, and the coating layer includes abrasion-resistant particles, and the abrasion-resistant particle may be a mixture of a particle having an average particle diameter of 0.2 to 0.8 times the thickness of the coating layer and a particle having an average particle diameter of 1.0 to 2.0 times the thickness of the coating layer.

A particle having a larger average particle diameter of the abrasion-resistant particle may be included in an amount of 60 to 80% by weight, on the basis of a total % by weight of the abrasion-resistant particle.

A thickness of the coating layer positioned on the chromium-free undercoat film may be 3 to 20 μm.

A surface roughness (Ra) of the coating layer positioned on the chromium-free undercoat film may be less than 1 μm.

An adhesion amount of the chromium-free undercoat film positioned on one side or both sides of the base steel sheet may be 500 to 2,000 mg/m$^2$.

The base steel sheet may include carbon steel, aluminum steel, aluminum alloy steel, stainless steel, copper steel, galvanized steel sheet, binary or ternary alloy coated steel sheet including zinc, or a combination thereof.

Yet another embodiment of the present invention provides a method of preparing a black resin coated steel sheet including: preparing a base steel sheet; forming a chromium-free undercoat film positioned on one side or both sides of the base steel sheet; and forming a coating layer on the chromium-free undercoat film.

Here, the forming of the coating layer on the chromium-free undercoat film may include coating the resin composition on the chromium-free undercoat film; curing the base steel sheet coated with the resin composition; and washing and drying the cured base steel sheet, the coating layer may be formed by applying the resin composition, the resin composition may include 40% to 50% by weight of a polyester resin on the basis of a total of 100% by weight of the resin composition, the polyester resin may include a main resin and an auxiliary resin, the main resin may have a higher molecular weight than that of the auxiliary resin, and a difference of a glass transition temperature between the main resin and the auxiliary resin may be 25° C. or less.

The main resin may be included in an amount of 15 to 50% by weight on the basis of a total of 100% by weight of the polyester resin.

The molecular weight of the main resin may be more than 15,000 Mn to 80,000 Mn or less, and the molecular weight of the auxiliary resin may be 12,000 Mn to 20,000 Mn.

The glass transition temperature of the main resin may be 5 to 20° C. and the glass transition temperature of the auxiliary resin may be 20 to 30° C.

By the curing of the base steel sheet coated with the resin composition, the base steel sheet may be heat treated at 210 to 240° C.

In the forming of the chromium-free undercoat film positioned on one side or both sides of the base steel sheet, an adhesion amount of the chromium-free undercoat film may be 500 to 2,000 mg/m$^2$ In the preparing of the base steel sheet, the base steel sheet may include carbon steel, aluminum steel, aluminum alloy steel, stainless steel, copper steel, galvanized steel sheet, binary or ternary alloy coated steel sheet including zinc, or a combination thereof.

Advantageous Effects

The black resin coated steel sheet using the resin composition according to an exemplary embodiment of the present invention may have excellent press workability even after quick-drying punching oil is applied.

There may be provided a black resin coated steel sheet having high hardness and excellent flexibility by using the resin composition including a polyester resin including two kinds of resins different in molecular weight and glass transition temperature. In addition, a degree of cross-linking of the steel sheet may be increased.

MODE FOR INVENTION

Advantages and features of the present invention and methods to achieve them will be elucidated from exemplary embodiments described below in detail with reference to the accompanying drawings. However, the present invention is not limited to the exemplary embodiments disclosed herein but will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Like reference numerals refer to like components throughout the specification.

Thus, in some exemplary embodiments, well-known techniques are not specifically described to avoid an ambiguous interpretation of the present invention. Unless defined otherwise, all terms (including technical and scientific terms) used in the specification of the present invention may be used in a sense commonly understood by one of those skilled in the art to which this invention belongs. Throughout the specification, unless explicitly described to the contrary, the word "comprise" and variations such as "comprises" or "comprising", will be understood to imply the inclusion of stated elements but not the exclusion of any other elements. In addition, a singular form includes a plural form in the present specification unless specifically stated in the context.

A resin composition according to an exemplary embodiment of the present invention may include 40% to 50% by weight of a polyester resin on the basis of a total of 100% by weight of the composition, the polyester resin including a main resin and an auxiliary resin, wherein the main resin has a higher molecular weight than the auxiliary resin, and a difference of a glass transition temperature between the main resin and the auxiliary resin is 25° C. or less.

More specifically, the polyester resin may include a main resin and an auxiliary resin. More specifically, the molecular weight of the main resin may be more than 15,000 Mn to 80,000 Mn or less, and the molecular weight of the auxiliary resin may be 12,000 Mn to 20,000 Mn. In addition, the main resin may have a higher molecular weight than that of the auxiliary resin.

Further, the glass transition temperature of the main resin may be 5 to 20° C. and the glass transition temperature of the auxiliary resin may be 20 to 30° C. Further, a difference of a glass transition temperature between the main resin and the auxiliary resin may be 25° C. or less.

Here, the glass transition temperature means a state transition temperature at which polymer molecular chains are freely movable. More specifically, the lower the glass transition temperature, the lower the hardness and the better the workability, whereas the higher the glass transition temperature, the lower the workability due to the increase in hardness. Therefore, the resin composition according to an exemplary embodiment of the present invention may secure excellent hardness, degree of cross-linking and flexibility by mixing two kinds of polyester resins of 'low glass transition temperature-high molecular weight' and 'high glass transition temperature-low molecular weight'.

More specifically, when the molecular weight of the main resin is small, it may be difficult to obtain flexibility and workability due to a short polymer length. In addition, a pick-up property may be deteriorated at the time of coating using a roll coating method. On the other hand, when the molecular weight of the main resin is large, an effect of improving workability may be insignificant. Further, spreadability of a coating material may be deteriorated due to an increase in viscosity, and after curing, the degree of cross-linking may be deteriorated.

Further, the pick-up property in the specification of the present invention refers to a property that when a black resin coating solution is transferred to an applicator roll by a pickup roll, it is transferred without breaking due to an appropriate viscosity. Therefore, when the pick-up property is excellent, the black resin coating solution may be transferred to a steel sheet without breaking.

In addition, when the glass transition temperature of the main resin is excessively low, flexibility may be excellent, but the hardness after curing is deteriorated, and thus the coating layer may be easily damaged. On the other hand, when the glass transition temperature of the main resin is high, the hardness of the coating layer rapidly increases after curing, and thus the workability may be deteriorated. Thus, at the time of 0t-bending, a crack may occur, and close contacting property may be deteriorated.

In the specification of the present invention, 0t-bending means the most severe condition in a bending test for evaluating workability of a steel sheet. More specifically, since t-bending is determined depending on the number of steel sheets positioned between bending members, the steel sheet satisfying the 0t-bending condition means very good workability.

In addition, when the molecular weight of the auxiliary resin is small, it may be difficult to secure workability. The pick-up property may be deteriorated at the time of coating using a roll coating method. On the other hand, when the molecular weight of the auxiliary resin is large, an effect of improving workability may be insignificant, and a degree of curing may be deteriorated.

In addition, when the glass transition temperature of the auxiliary resin is excessively low, the hardness after curing is deteriorated, and thus the coating layer may be easily damaged. On the other hand, when the glass transition temperature of the auxiliary resin is high, the hardness of the coating layer rapidly increases after curing, and thus the workability may be deteriorated. Further, at the time of 0t-bending, a crack may occur, and close contacting property may be deteriorated.

Further, on the basis of 100% by weight of the polyester resin, the main resin may be included in an amount of 15 to 50% by weight and the auxiliary resin may be included in an amount of 50 to 85% by weight.

When the content of the main resin having a higher molecular weight and lower glass transition temperature than those of the auxiliary resin is excessively small, flexibility of the coating layer after curing may be lowered due to decrease of the content of the polymer. As a result, coating workability may be deteriorated. On the other hand, when the content of the main resin is excessively large, the flexibility may be improved, but cross-linking density may be lowered to reduce corrosion resistance and washing ability of punching oil.

In the specification of the present invention, the punching oil means a press oil used for cooling heat generation of a mold when the steel sheet is continuously pressed. Otherwise, the punching oil means a press oil applied to a surface of a steel sheet or a press mold for a lubricating action between the mold and the steel sheet at the time of pressing.

Further, the resin composition may further include, on the basis of a total of 100% by weight of the composition, 3 to 10% by weight of the melamine resin, 1 to 5% by weight of the abrasion-resistant particle, 0.1 to 3% by weight of the wax, and the residual solvent.

More specifically, the abrasion-resistant particle may be an acrylic polymer-based particle. More specifically, the abrasion-resistant particle may include polymethyl methacrylate, acryl, or a combination thereof.

The abrasion-resistant particle serves to improve scratch resistance or abrasion resistance. More specifically, a melting point of the abrasion-resistant particle is characterized by being higher than a curing temperature of a chromium-free undercoat film to be described below. As a result, the abrasion-resistant particle remains in the form of a solid-phase particle even after curing.

More specifically, a technique of applying and coating the resin composition on one side or both sides of a base steel sheet including a chromium-free undercoat film will be described below.

Meanwhile, here, the abrasion-resistant particle included in the resin composition may have a mixed form of a particle having an average particle diameter of 0.2 to 0.8 times the thickness of the coating layer and a particle having an average particle diameter of 1.0 to 2.0 times the thickness of the coating layer. Therefore, a size of the abrasion-resistant particle may vary depending on the thickness of the coating layer on the base steel sheet.

When two kinds of particles having different sizes of the abrasion-resistant particles are mixed, surface appearance may be improved as compared to a case where one size particle is applied.

More specifically, any one of the abrasion-resistant particles may have a black color. Still more specifically, the particle having a small average particle diameter may have a black color. Thus, as compared to a case where only the particle having a large average particle diameter is used, it is possible to suppress a phenomenon that a surface portion of the coating layer is partially whitened, and to secure a surface appearance with good quality.

In addition, the abrasion-resistant particle having a large average particle diameter of the abrasion-resistant particle may be included in an amount of 60 to 80% by weight on the basis of a total % by weight of the abrasion-resistant particle.

When the average particle diameter of the abrasion-resistant particle is excessively large than that of the thickness of the coating layer or the content thereof is excessively large, the surface roughness may be increased, which may reduce the surface gloss. Further, line delamination may be caused at a particle protrusion part when measuring friction.

The wax may include polyethylene, polyethylene-polytetrafluoroethylene, or a combination thereof. More specifically, the wax serves to impart lubricity to the steel sheet so that the steel sheet is able to be easily drawn along a shape of the mold during press molding. Further, the wax has a relatively small specific gravity, and serves to float the surface.

In addition, when the weight of the wax is less than the range disclosed herein, lubricity of the steel sheet after curing may be lowered. On the other hand, when the weight of the wax is excessively large, an effect of improving the lubricity of the steel sheet after curing is insignificant, whereas a cross-linking ability may be lowered due to the wax floating on the surface, resulting in reduction of corrosion resistance. In addition, a reaction with the punching oil may be facilitated, and surface defects such as stains, or the like, may occur at the time of washing.

In addition, the solvent may also include propylene glycol methyl ether acetate, a ketone-based, a hydrocarbon-based, a dibasic ester, or a combination thereof. However, the present invention is not limited thereto.

When the content of the solvent is small, viscosity may become high and solution stability and leveling property may be deteriorated. In addition, when the content of the solvent is excessively high, a high temperature or a long time is required for volatilization of the solvent at the time of curing the solution, and productivity may be deteriorated. In addition, surface defects such as sticking, blocking, etc., may occur during transportation.

The resin composition may further include, on the basis of a total of 100% by weight of the composition, 0.3 to 1.5% by weight of an acid catalyst, 3 to 5% by weight of a pigment, and 2 to 5% by weight of an additive.

The acid catalyst may include dinonylnaphthalene sulfonic acid or a combination thereof. In addition, the acid catalyst may include 0.3 to 1.5% by weight on the basis of a total of 100% by weight of the composition.

However, when a content of the acid catalyst is small, the degree of curing and the hardness of the chromium-free undercoat film may be deteriorated. On the other hand, when the content of the acid catalyst is large, workability may be deteriorated.

The pigment may be a mixture of carbon black and titanium oxide ($TiO_2$). Further, the pigment may be included in an amount of 3 to 5% by weight. However, the present invention is not limited thereto.

More specifically, a weight ratio of the carbon black to the titanium oxide of the pigment may be 1 to 30. When the weight ratio of carbon black is less than 1, blackness of the steel sheet may be deteriorated, and thus sufficient hiding effect may not be exhibited. When the weight ratio of carbon black is more than 30, an increase in blackness is insignificant, but the workability is deteriorated.

The pigment serves to impart color and opacity to the coating layer. However, when the content of the pigment is small, a hiding power of the chromium-free undercoat film to be described later is deteriorated, and thus appearance of the surface may not be secured, in addition, when the content of the pigment is large, the workability may be deteriorated.

The additive may be included in an amount of 2 to 5% by weight on the basis of a total of 100% by weight of the composition. In addition, the additive may include an adhesion promoter, a leveling agent, a dispersing agent, and a quencher. More specifically, the adhesion promoter may include a hydroxyl phosphate ester, or a combination thereof. In addition, the leveling agent may include polyacrylate, polysiloxane, or a combination thereof. However, the present invention is not limited thereto.

Further, the dispersing agent may include an acrylic polymer dispersing agent, a urethane-based polymer dispersing agent, or a combination thereof. The dispersing agent serves to disperse a particulated pigment to prevent aggregation.

In addition, the quencher may include amorphous silica. The quencher serves to reduce gloss by inducing surface diffuse reflection. Therefore, a content may be adjusted according to a desired degree of gloss.

A black resin coated steel sheet according to another embodiment of the present invention may include a base steel sheet; a chromium-free undercoat film positioned on one side or both sides of the base steel sheet; and a coating layer positioned on the chromium-free undercoat film, wherein, on the basis of a total element composition of 100% by weight of the coating layer, the coating layer includes 70 to 80% by weight of carbon (C), 1 to 4% by weight of silicon (Si), 1 to 5% by weight of titanium (Ti), and residual oxygen (O).

The base steel sheet may include carbon steel, aluminum steel, aluminum alloy steel, stainless steel, copper steel, galvanized steel sheet, binary or ternary alloy coated steel sheet including zinc, or a combination thereof. Meanwhile, the present invention is not limited thereto.

The chromium-free undercoat film may be positioned on one side or both sides of the base steel sheet. More specifically, an adhesion amount of the chromium-free undercoat film positioned on one side or both sides of the base steel sheet may be 500 to 2,000 mg/m$^2$.

When the adhesion amount of the chromium-free undercoat film is small, corrosion resistance may be lowered. On the other hand, when the adhesion amount is large, since a thickness of the undercoat film becomes thicker, heat transfer efficiency to a black topcoat film may be deteriorated, and thus curing force may be weakened.

The coating layer may be positioned on one side or both sides of the chromium-free undercoat film. The coating layer positioned on the chromium-free undercoat film may have a thickness of 3 to 20 μm.

When the thickness of the coating layer is excessively thin, corrosion resistance and scratch resistance may be deteriorated. In addition, a whiteness index (L value) may increase since a hiding power of the chromium-free undercoat film is deteriorated. On the other hand, when the thickness of the coating layer is excessively thick, the curing efficiency may be lowered, and productivity may be lowered, and resistance such as sticking and blocking may be lowered.

The whiteness index (L value) in the specification of the present invention means that a total of six axes exist in positive and negative directions of x, y and z axes in the three-dimensional space, and the color of the steel sheet is displayed through derived values.

More specifically, it means that as the value closer to 100 in the z-axis direction is derived, the color of the steel sheet is close to white, as the positive value in the x-axis direction is larger, the color is close to red, and as the positive value in the y-axis direction is larger, the color is close to yellow.

In addition, the surface roughness (Ra) of the coating layer on the chromium-free undercoat film may be less than 1 μm. When the surface roughness of the coating layer is large, surface gloss may be lowered due to promotion of diffuse reflection, and thus surface quality may be lowered, and surface texture may become rough.

Further, the base steel sheet in which the coating layer is formed by using the resin composition may have a surface gloss of 10 to 40.

A method of preparing a black resin coated steel sheet according to still another embodiment of the present invention may include preparing a base steel sheet; forming a chromium-free undercoat film positioned on one side or both sides of the base steel sheet; and forming a coating layer on the chromium-free undercoat film, wherein the forming of the coating layer on the chromium-free undercoat film includes coating the composition on the chromium-free undercoat film; curing the base steel sheet coated with the composition; and washing and drying the cured base steel sheet, the coating layer is formed by applying a resin composition, the resin composition may include 40% to 50% by weight of a polyester resin on the basis of a total of 100% by weight of the composition, the polyester resin may include a main resin and an auxiliary resin, the main resin may have a higher molecular weight than that of the auxiliary resin, and a difference of a glass transition temperature between the main resin and the auxiliary resin may be 25° C. or less.

First, in the preparing of the base steel sheet; the base steel sheet may include carbon steel, aluminum steel, aluminum alloy steel, stainless steel, copper steel, galvanized steel sheet, binary or ternary alloy coated steel sheet including zinc, or a combination thereof. However, the present invention is not limited thereto.

Next, in the forming of the chromium-free undercoat film positioned on one side or both sides of the base steel sheet; an adhesion amount of the chromium-free undercoat film may be 500 to 2,000 mg/m$^2$ When the adhesion amount of the chromium-free undercoat film is excessively small, corrosion resistance may be lowered. On the other hand, when the adhesion amount is excessively large, since a thickness of the undercoat film becomes thicker, heat transfer efficiency to a black topcoat film may be deteriorated, and thus curing force may be weakened.

In addition, the forming of the coating layer on the chromium-free undercoat film may include coating the composition on the chromium-free undercoat film; curing the base steel sheet coated with the composition; and washing and drying the cured base steel sheet.

Here, by the curing of the base steel sheet coated with the composition, the base steel sheet may be heat treated at 210 to 240° C.

Further, the heat treatment may be performed by an induction heating equipment. By heat treating the base steel sheet to 210 to 240° C., the coating film may be cured to complete the formation of the coating layer.

Hereinafter, Examples will be described in detail. However, the following Examples are provided only to illustrate the present invention, and accordingly, the present invention is not limited to the following Examples.

EXAMPLE

Example 1

An alkaline degreased 0.4 mm thick galvanized steel sheet was prepared.

Here, an adhesion amount of a zinc plating layer in the galvanized steel sheet was 20 g/m$^2$.

A chromium-free composition was subjected to coating, curing, washing, and drying on one side of the galvanized steel sheet to form a chromium-free undercoat film.

Here, an adhesion amount of the chromium-free undercoat film was 1,000 mg/m$^2$.

Then, the resin composition was prepared as shown in Table 1 below.

The resin composition was coated on the galvanized steel sheet on which the chromium-free undercoat film was formed, then cured by induction heating so as to have a peak metal temperature of 232° C., followed by washing and drying, thereby preparing a black resin coated steel sheet. Here, the dried coating layer had a thickness of 10 μm.

TABLE 1

| Classification | Component | Weight (g) |
| --- | --- | --- |
| Polyester resin | Main resin having molecular weight of 23,000 Mn and glass transition temperature of 7° C. | 20 |
| | Auxiliary resin having molecular weight of 12,000 Mn and glass transition temperature of 20° C. | 25 |
| Pigment | Carbon black | 1.75 |
| | Titanium oxide | 2.25 |
| Dispersing agent | Fumed silica | 0.1 |
| Melamine curing resin | Methyl group substituted type (Highly methylated), molecular weight: 390 | 7 |
| Wax | Mixture of polyethylene (0.6 g) and polyethylene-polytetrafluoroethylene (1.4 g) | 2 |
| Abrasion-resistant particle | Mixture of polymethyl metacrylate 5 μm particle (1 g) and polymethyl metaacrylate 15 μm particle (2 g) | 3 |
| Quencher | Amorphous silica | 0.95 |
| Acid catalyst | Dinonylnaphthalene sulfonic acid | 1 |
| Leveling agent | Polyacrylate | 1.45 |
| Adhesion promoter | Hydroxyl phosphate ester | 0.5 |
| Solvent | Mixture of propylene glycol methyl ether acetate, cyclohexanone, aromanaphtha and dibasic ester | 35 |

Example 2

As compared to Example 1 above, Example 2 used a polyester resin including 22.5 g of a main resin having a molecular weight of 23,000 Mn and a glass transition temperature of 7° C. and 22.5 g of an auxiliary resin having a molecular weight of 12,000 Mn and a glass transition temperature of 20° C.

A black resin coated steel sheet was prepared under the same conditions as in Example 1 except for the polyester resin.

Example 3

As compared to Example 1 above, Example 3 used a wax composed of 2 g of polyethylene-polytetrafluoroethylene.

A black resin coated steel sheet was prepared under the same conditions as in Example 1 except for the wax.

Example 4

As compared to Example 1 above, Example 4 used a wax composed of 2 g of polyethylene.

A black resin coated steel sheet was prepared under the same conditions as in Example 1 except for the wax.

Example 5

As compared to Example 1 above, Example 5 used a polyester resin including 25 g of a main resin having a molecular weight of 23,000 Mn and a glass transition temperature of 7° C. and 25 g of an auxiliary resin having a molecular weight of 12,000 Mn and a glass transition temperature of 20° C., and used 30 g a solvent.

A black resin coated steel sheet was prepared under the same conditions as in Example 1 except for the polyester resin and the solvent.

Comparative Example 1

As compared to Example 1 above, Comparative Example 1 used a wax composed of 0.17 g of polyethylene, 0.13 g of polyethylene-polytetrafluoroethylene, and 1.7 g of liquid phase silicon.

A black resin coated steel sheet was prepared under the same conditions as in Example 1 except for the wax.

Comparative Example 2

As compared to Example 1 above, Comparative Example 2 was prepared so that an adhesion amount of a chromium-free undercoat film was 2,500 mg/m².

A black resin coated steel sheet was prepared under the same conditions as in Example 1 except for the adhesion amount of the chromium-free undercoat film.

Comparative Example 3

As compared to Example 1 above, Comparative Example 3 contained 2 g and 1 g of the abrasion-resistant particles having an average particle diameter of 15 μm and 20 μm, respectively.

A black resin coated steel sheet was prepared under the same conditions as in Example 1, except that the abrasion-resistant particle conditions were different.

Comparative Example 4

As compared to Example 1 above, Comparative Example 4 used one type of polyester resin having a molecular weight of 19,000 and a glass transition temperature of 10° C.

A black resin coated steel sheet was prepared under the same conditions as in Example 1, except that the polyester resin conditions were different.

Comparative Example 5

As compared to Example 1 above, Comparative Example 5 used one type of polyester resin having a molecular weight of 12,000 and a glass transition temperature of 20° C.

A black resin coated steel sheet was prepared under the same conditions as in Example 1, except that the polyester resin conditions were different.

Comparative Example 6

As compared to Example 1 above, Comparative Example 6 used a polyester resin including 20 g of a main resin having a molecular weight of 12,000 Mn and a glass transition temperature of 5° C. and 25 g of an auxiliary resin having a molecular weight of 10,000 Mn and a glass transition temperature of 35° C.

A black resin coated steel sheet was prepared under the same conditions as in Example 1 except for the polyester resin.

EXPERIMENTAL EXAMPLE

Experimental Example 1: Evaluation Experiment of Coefficient of Friction

A coefficient of friction of a surface of the black resin coated steel sheet was evaluated by a friction tester. The black resin coated steel sheet specimen was sheared to a size of 148×290 mm and the coefficient of friction was measured. The coefficient of friction was measured at a pressing force of 600 kgf, and a moving speed of 3.3 mm/s. Further, in order to confirm an influence of a coefficient of friction by applying a quick-drying punching oil, the coefficient of friction after the punching oil was applied was compared.

More specifically, MVP 840TW insoluble plasticizer processing oil of VS & Ein Chemical Co., Ltd., was used as the quick-drying punching oil. The coefficient of friction was defined as an average value of the friction coefficients in a 45 to 185 mm section on the basis of a total moving distance of 190 mm.

In the evaluation experiment of coefficient of friction, it is better that the coefficient of friction is small and parallel with the moving distance. More specifically, the evaluation results are shown in Table 2 below, wherein ⊚ indicated very good (less than 0.09), ○ indicated good (0.09 to 0.11), Δ indicated normal (0.11 to 0.13), and X indicated insufficient (more than 0.13) or delamination occurrence.

When measuring the coefficient of friction after applying the punching oil, a case where stick-slip occurred in the graph was marked as X (insufficient).

Experimental Example 2: Evaluation Experiment of Stretch 0t Bending Workability

The black resin coated steel sheets prepared in the Examples and the Comparative Examples were subjected to stretch 0t-bending, and tape peeling and bending part cracks were observed to evaluate the workability. The black resin coated steel sheet specimen was sheared to a size of 35×150 mm, followed by 20% stretching, 0t-bending, and a Nichiban tape was attached to and detached from the bending part to check whether or not the coating film was peeled off. Then, the 0t-bending part was observed by a stereoscope to check a degree of crack occurrence. Here, when an adhesion property of the coating film was inferior, the coating film was attached to the tape. Further, when observing the bending part by a microscope, it could be confirmed whether or not a processing part was stably maintained even after bending and peeling off the tape, and the degree of crack occurrence could be determined. As a result, whether or not it was possible to secure good workability at a portion where the coating film was deformed, such as a curling part of a press material edge, could be predicted.

Here, the evaluation results of the tape peeling are shown in Table 2 below, wherein ○ indicated good (no peeling), and X indicated insufficient (peeling) and the evaluation results of the bending part crack are shown in Table 2 below, wherein ⊚ indicated very good (no crack), ○ indicated good (point crack), Δ indicated normal (fine crack), X indicated insufficient (crack or surface peeling of coating film).

Experimental Example 3: Evaluation Experiment of Boiling Resistance

The black resin coated steel sheets prepared in the Examples and the Comparative Examples were used to evaluate boiling resistance. The evaluation was performed by confirming a degree of surface change after immersing the steel sheet in the boiling water for 2 hours and taking out the steel sheet, wherein if a surface curing force is weak, the boiling water penetrates into the coating layer, which may cause a serious change of the surface such as blister (coating layer swelling phenomenon).

In the evaluation method, evaluation results were divided into ○ (excellent, no surface change), and X (insufficient, blister occurrence) and shown in Table 2 below.

Experimental Example 4: Evaluation Experiment of Sticking Resistance

The black resin coated steel sheet was sheared to a size of 100×100 mm, then a specimen burr was removed, and a black face and a non-black face were faced to each other. The sticking resistance was evaluated using a hot press machine under the conditions of a temperature of 80° C. and a pressing force of 100 kgf/cm$^2$ for 8 hours. After the experiment was completed, a hot plate top plate was separated from the specimen and a heating lamp was also turned off, and the specimen was cooled to room temperature. Then, a degree of strength when detaching the pair of facing specimens was evaluated.

The sticking score is obtained with 10 out of 10 points for each according to ASTM D3003. Scoring criteria according to the ASTM standard are as follows.

10 points: Upper and lower specimens were already deviated 8 points: Specimens could be separated when lightly pushing the specimen with finger 6 points: No specimen deformation and no mechanism for specimen separation 4 points: Specimens could be separated by putting nail between the specimens and applying force and specimen deformation (warpage) occurred 2 points: Spatula or similar equipment was required to be used for specimen separation.

0 point: Separation was not possible even though the equipment used for 2 points was used The sticking resistance evaluation is a method of evaluating whether or not the black surface-non-black surface is pressed and attached by mutual reaction in a process of transporting the black resin coated steel sheet in a coil winding state, and a degree thereof.

In the evaluation method, depending on the sticking score, evaluation results were divided into ○ (excellent, 9 to 10 points), Δ (normal, 6 to 8 points), and X (insufficient, 5 points or less) according to the sticking score, and shown in Table 2 below.

Experimental Example 5: Evaluation Experiment of Drawbead

Figure 1:
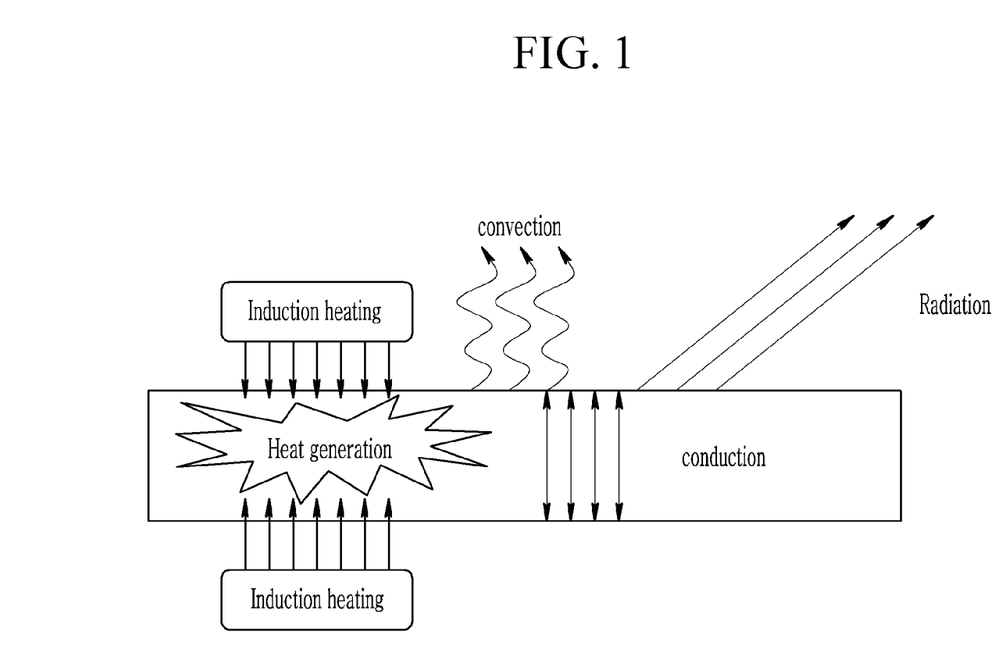
FIG. 1 shows transfer of heat in induction heating.
Figure 2:
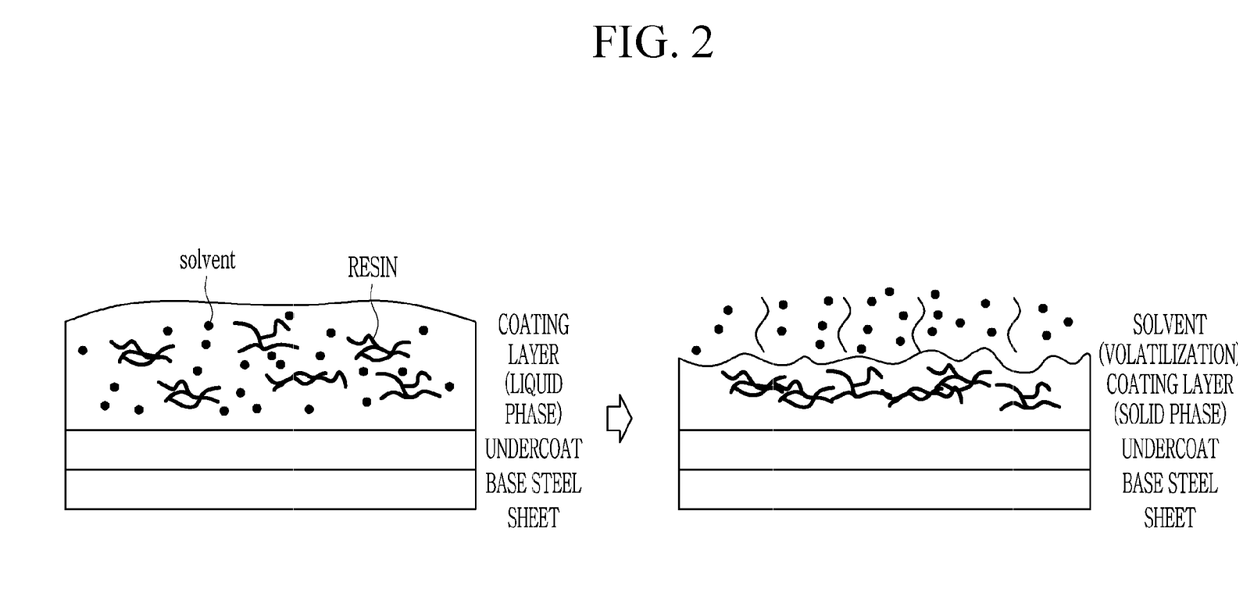
FIG. 2 is a schematic view of a coating layer before and after the induction heating.
Figure 3:
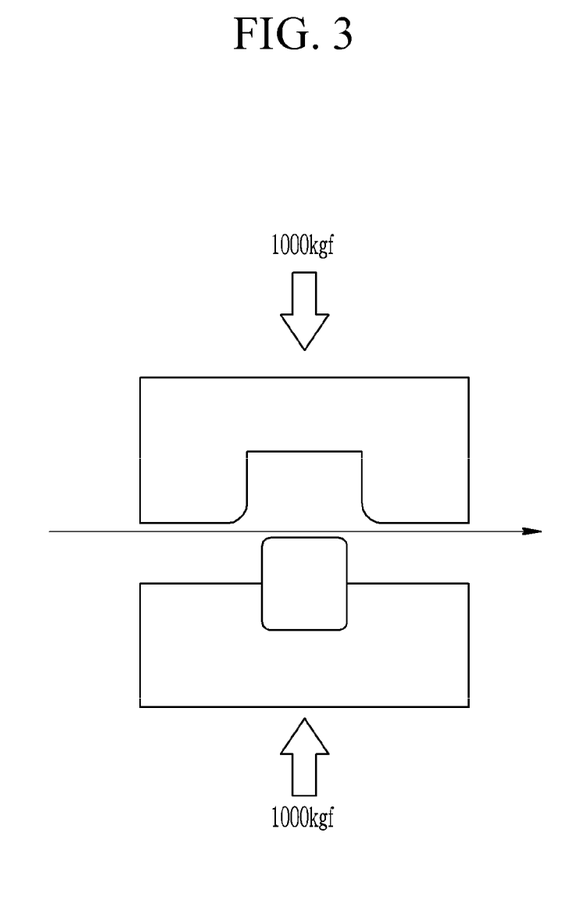
FIG. 3 shows a drawbead evaluation device.

A bead is a part that holds a material during press forming and prevents the material from being sucked in. The specimen is generally sheared in the press process, but if damage such as scratch, peeling, or the like, is caused in the bead part coating film, a peeling material is transferred to the mold to cause defects such as dent in the subsequent working material. Therefore, it is possible to determine whether or not continuous work of stable press is able to be performed by preliminarily simulating this through the present evaluation. After shearing to a size 44×250 mm, it was evaluated under conditions of a drawing length 90 mm and a pressing load 1000 kgf as shown in FIG. 3. After each evaluation, the mold was wiped with 2000 grit sandpaper and washed with alcohol to minimize an effect of previous evaluation material. Here, evaluation was performed based on the case after applying the punching oil in order to confirm the influence of the application of the quick-drying punching oil. MVP 840TW insoluble plasticizer processing oil of VS & Ein Chemical Co., Ltd., was used as the quick-drying punching oil.

In the evaluation method, depending on the drawing load divided by the pressing load, evaluation results were divided into ○ (excellent, less than 0.34), Δ (normal, 0.34 or more to less than 0.36), and X (insufficient, 0.36 or more or bead part peeling occurred) according to the sticking score, and shown in Table 2 below.

TABLE 2

| Classification | | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Coefficient of friction | | ⊚ | ⊚ | ○ | ○ | ○ | X | X | ○ | X | X | Δ |
| Stretch (20%) 0t-bending | Tape peeling | ○ | ○ | ○ | ○ | ○ | ○ | X | ○ | ○ | ○ | ○ |
| | Bending part Crack | ⊚ | ⊚ | ○ | ○ | ⊚ | ○ | Δ | ○ | ○ | Δ | X |
| | Boiling resistance | ○ | ○ | ○ | ○ | ○ | ○ | X | ○ | ○ | ○ | ○ |
| | Sticking resistance | ○ | ○ | ○ | Δ | ○ | ○ | X | ○ | ○ | ○ | ○ |
| | Drawbead molding | ○ | ○ | Δ | Δ | ○ | X | X | X | X | X | X |

As shown in Table 2, the black resin coated steel sheets prepared in Examples 1 to 4 had excellent results in the coefficient of friction measurement and the drawbead evaluation after the punching oil was applied, and had good results in all of stretch 0t-bending, boiling resistance, and sticking resistance evaluation.

On the other hand, it could be appreciated that in Comparative Examples, stick-slip behavior was observed during the coefficient of friction measurement, the drawing load was high in the drawbead evaluation, or the bead part coating film was peeled off (Comparative Example 3), and thus physical properties were poor than those of Examples.

In particular, in Comparative Example 2, due to excess of the adhesion amount of the chromium-free undercoat film, heat transfer to the black topcoat was insufficient during induction heating, and overall physical properties were extremely poor. Thus, it could be appreciated that induction of the appropriate range of the adhesion amount of the chromium-free undercoat film during induction heating is a very important condition for securing curing efficiency.

Although exemplary embodiments of the present invention have been described with reference to the accompanying drawings, those skilled in the art will appreciate that various modifications and alterations may be made without departing from the technical spirit or essential feature of the present invention.

Therefore, it is to be understood that exemplary embodiments described hereinabove are illustrative rather than being restrictive in all aspects. The scope of the present invention is shown by the claims to be described below rather than the detailed description, and the present invention should be interpreted to cover all modifications or variations derived from the meaning and scope of the appended claims and their equivalents.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A resin composition for a black resin coated steel sheet comprising: 40% to 50% by weight of a polyester resin on the basis of a total of 100% by weight of the composition, and
   the balance including at least one material selected from a melamine resin, an abrasion-resistant particle, a wax, and a solvent,
   wherein the polyester resin includes a main resin and an auxiliary resin,
   the main resin has a higher molecular weight than that of the auxiliary resin, and
   a difference of a glass transition temperature between the main resin and the auxiliary resin is 25° C. or less in an absolute value,
   wherein the molecular weight of the main resin is more than 15,000 Mn to 80,000 Mn, and the molecular weight of the auxiliary resin is 12,000 Mn to 20,000 Mn, and,
   wherein the glass transition temperature of the main resin is 5 to 20° C. and the glass transition temperature of the auxiliary resin is 20 to 30° C.

2. The resin composition for a black resin coated steel sheet of claim 1, wherein:
   the main resin is included in an amount of 15 to 50% by weight on the basis of 100% by weight of the polyester resin.

3. The resin composition for a black resin coated steel sheet of claim 1, further comprising:
   on the basis of a total of 100% by weight of the composition, 3 to 10% by weight of the melamine resin, 1 to 5% by weight of the abrasion-resistant particle, 0.1 to 3% by weight of the wax, and the residual solvent.

4. The resin composition for a black resin coated steel sheet of claim 3, further comprising:
   an acid catalyst, a pigment, and an additive,
   wherein, on the basis of a total of 100% by weight of the composition, the acid catalyst has an amount of 0.3 to 1.5% by weight, the pigment has an amount of 3 to 5% by weight, and the additive has an amount of 2 to 5% by weight.

5. The resin composition for a black resin coated steel sheet of claim 4, wherein:
   the additive includes an adhesion promoter, a leveling agent, a dispersing agent, and a quencher.

* * * * *